United States Patent [19]

Fast

[11] 4,044,720
[45] Aug. 30, 1977

[54] FLOATING FISH REARING SYSTEM

[76] Inventor: Arlo W. Fast, 1024 Moreno Drive, Ojai, Calif. 93023

[21] Appl. No.: 671,052

[22] Filed: Mar. 29, 1976

[51] Int. Cl.$^2$ .................................................. A01K 63/00
[52] U.S. Cl. ........................................................ 119/3
[58] Field of Search .............................. 119/3, 2, 4, 5

[56] References Cited

U.S. PATENT DOCUMENTS

| | | | |
|---|---|---|---|
| 3,653,358 | 4/1972 | Fremont | 119/3 |
| 3,916,832 | 11/1975 | Sweeney | 119/3 X |

*Primary Examiner*—Hugh R. Chamblee

*Attorney, Agent, or Firm*—Robert Charles Hill

[57] ABSTRACT

Apparatus and method for rearing fish in an open body of water by confining the fish in floating raceways located in a shallow zone near the water surface and flowing water from a deeper cold water zone through the raceways. An air injection means is supplied for injecting air into the water at the cold water zone to both aerate and pump the water through the system. Vertically adjustable means may be provided to intake water from various cold water depth zones. A floating waste settlement tank may also be provided downstream of the raceways for repurifying the water.

15 Claims, 13 Drawing Figures

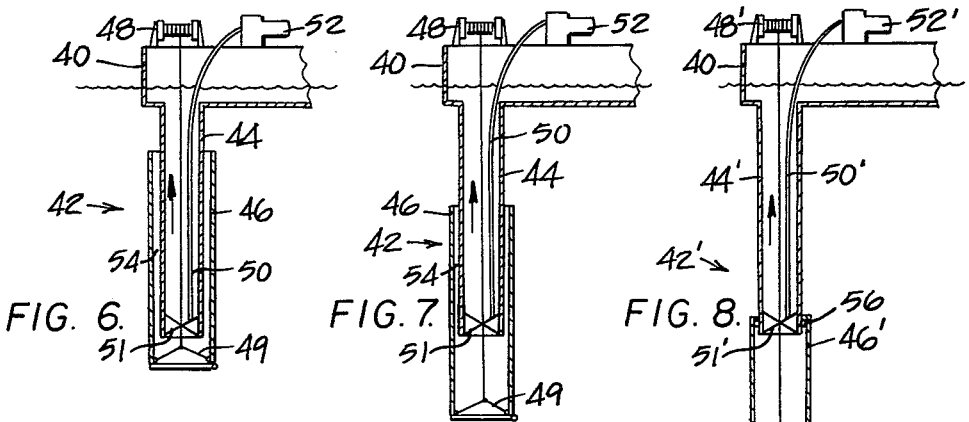
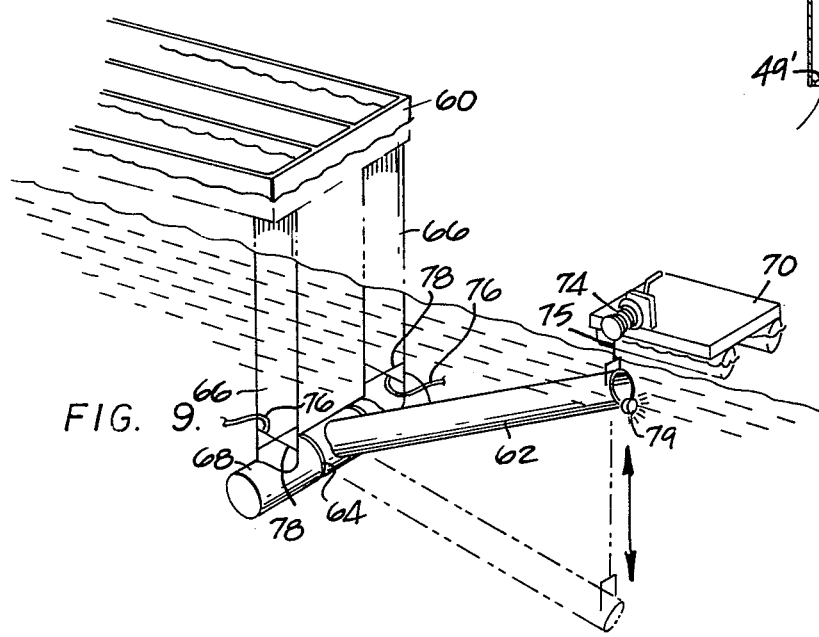
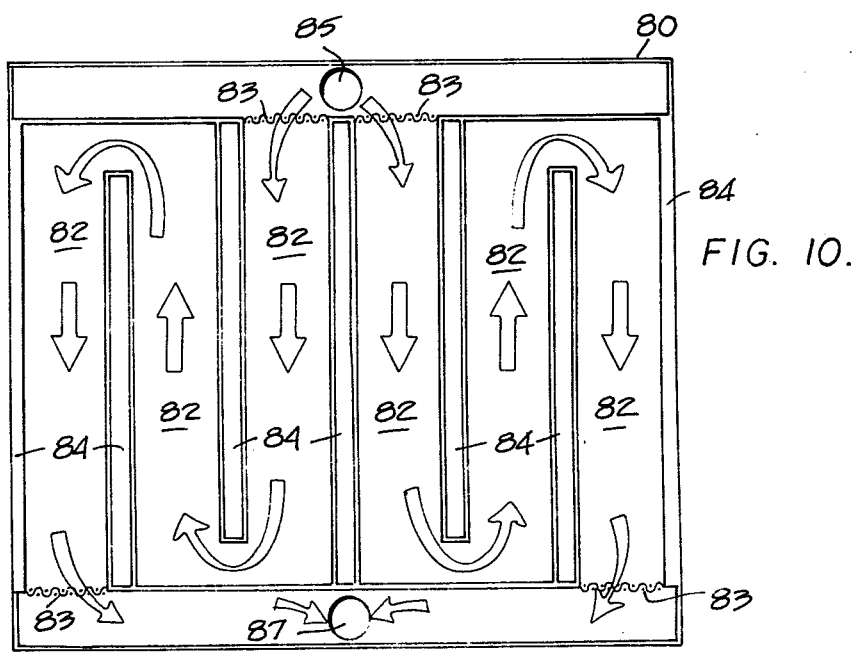

FLOATING FISH REARING SYSTEM

BACKGROUND OF THE INVENTION

This invention relates generally to a floating fish rearing system and more particularly to a system which provides for the rearing of fish, such as trout, in water bodies under normal circumstances would not permit controlled rearing near the surface thereof due to water temperature and/or oxygen content.

The merits of fish culture in general, and salmonid culture in particular, are well-known.

The future bodes well for fish culture, since fish culture will invariably increase greatly as wild fish stocks are depleted, fish rearing techniques are improved, genetic manipulations of fish are perfected, and peoples' eating habits change toward animal species which have high feed conversion ratios.

Presently, salmon and trout are the most popular species of cultivated fish in the United States. These fish are principally reared for "wild" population replenishment and supplementation, but they are also increasingly reared for the supermarket. State and Federal hatcheries during 1973 collectively produced 216,000,000 coldwater fish weighing 22,000,000 lbs. while commercial U.S. production totaled about 16,000,000 lbs. California State Hatcheries alone produced 55,372,495 fish weighing 4,134,216 lbs. during 1972-73. Trout (primarily rainbow trout) account for about 70% of all fish produced. Virtually all State and Federal production is for release to the "wild" whereas 80% of commercial production is for direct sale to the market.

Fish consumption in the U.S. is 11.2 lbs. per capita, compared with 70 lbs. per capita in most Asian countries. Fish consumption per capita in the U.S. will increase an energy conservation practices take effect. Fish production costs per pound of protein are less than similar beef costs and should decrease significantly as fish culture techniques are improved. Low cost of such a quality food item will increase demand for fish. In addition, as people become more health conscious, this diet should include significantly greater quantities of fish, since fish have lower concentrations of saturated fats.

The most common prior art fish rearing techniques include land-based, long raceway systems which are supplied by water diverted from streams, springs, or water pumped from wells. However in most parts of the country economically feasible sites for such operations are either very limited or non-existent. Pond systems, similar to land-based raceways, are also used but are subject to the same cost limitations and also provide more difficulties for controlled rearing since the fish are not as controllably confined as with raceway systems.

Floating pens have also been used and are most applicable to moving water locations especially salt water locations with a good tidal flush, and large rivers. Structural problems and problems of contamination and debris are limiting their present application. Also, recirculating systems which recycle most or all of the water have been used in the process of fish rearing. These latter systems generally use silos and may overcome many problems such as water shortages, temperature control and pollution effects of the discharged water. Thus far however these systems are too expensive to make fish rearing possible on a profitable basis.

The present invention overcomes the drawbacks of all of the above mentioned prior art devices and makes fish rearing possible in a relatively simple and profitable manner. Although the invention is primarily directed to trout culture in lakes, the principles thereof could also be used to rear other species in fresh or salt water.

One of the primary objects and advantages of the invention is good water temperature selection. With the present invention, it is possible to select the most desirable temperature found between the surface and maximum depth. Lake temperatures may range in the summer from 40° F. at the bottom to 75° F. at the surface in temperate lakes, and 55° to 80° F. in semi-tropical lakes such as those characteristic of many lower elevation California areas. Temperatures may be selected to accelerate or retard fish growth or to cause ripening of brood stock. With the present invention, it is possible to simultaneously have different water temperatures in different raceways.

A related advantage of the invention is an almost restricted geographical limitation. The system can be operated essentially any place in the U.S. which has a sufficient volume of deep, thermally stratified water. This greatly expands the range limitations of conventional raceways. It also makes use of the system possible in areas such as San Diego which has reservoirs suitable for the present inventive system but which has few small streams flowing year long and of the type suitable for more conventional trout rearing operations.

A further and important advantage of the present invention is the use of an unlimited water supply since the system recycles water within the lake. Conventional hatcheries have once through flow or they must use expensive means of reclaiming and reusing the water. Water shortages are one of the major limitations on conventional trout rearing. This situation will get worse as the demand for fish like trout increases and the usable water decreases due to other demands on its use. Furthermore, conventional hatcheries are faced with severe water shortages due to seasonal flows. Typically they are dependent on stream flows which are greatest in the spring and lowest in late summer when the water is most needed. It is also difficult to predict in advance what the situation will be in a given year.

A further advantage of the invention is good water flow control. With the present system, the rate of water flow can be adjusted to meet the needs at a given time.

Another advantage of the invention is debris free water since the water enters the system at a deep water zone. As a result less time is spent removing brush and other trash from raceway screens. Clogged screens could cause high fish mortality.

A further advantage of the invention is the minimal use of expensive land based operations. The system can be easily moved about the lake and additional raceways added to meet demand, etc.

A further advantage of the invention is a possible supply of free fish food in many applications. The deep waters of well oxygenated lakes normally have the greatest zooplankton concentrations during the daytime. The upwelled water may contain sufficient zooplankton concentrations to greatly reduce or eliminate feeding of the fish with prepared food such as dry pellets. This will reduce labor, food costs and pollution problems.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIGS. 6, 7 and 8 are schematic representations of a modified form of the invention.

FIG. 9 shows yet another modification of the invention.

FIGS. 10 and 11 are top plan views of modified raceway systems for use in the present invention.

DESCRIPTION OF THE PREFERRED EMBODIMENTS

Figure 1:
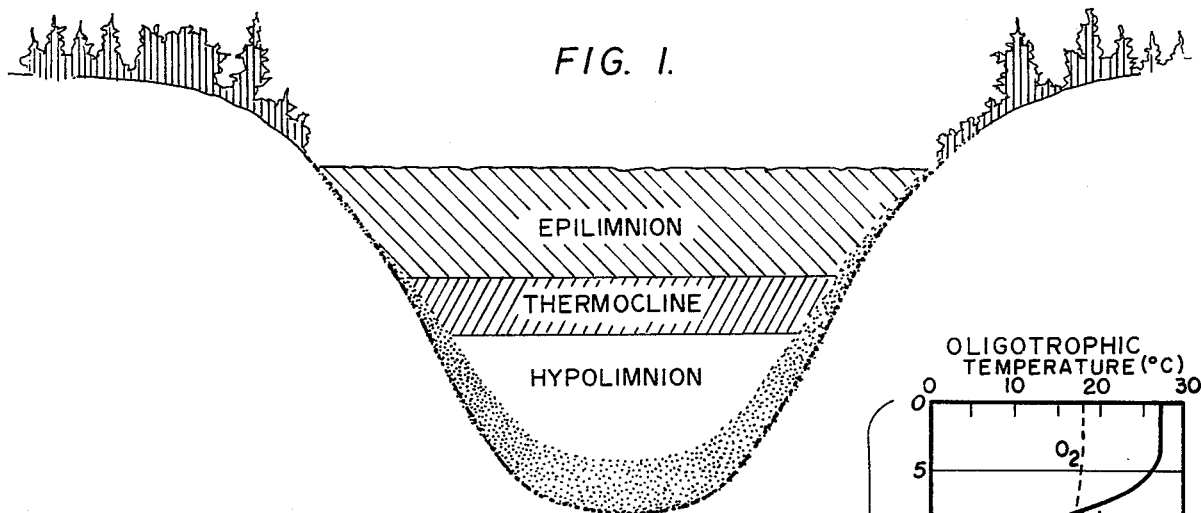
FIG. 1 is a side sectional view of a thermally stratified body of water.

Referring now to the drawings, it should be noted that the floating fish rearing system of the present invention will have application to standing bodies of water, such as lakes and oceans, which stratify thermally part or all of the year, as well as all non-stratified bodies of water.

As shown in FIG. 1, thermal stratification leads to the formation of three depth zones. The first such zone is the epilimnion which constitutes the warmwater region of the lake where temperatures may exceed 80° F. The water in this zone is circulated by the wind and oxygen concentrations are generally near saturation.

The second zone is the thermocline or metalimnion. This is a zone of rapid temperature change, e.g., generally defined by a change of 1° C. or more per 1.0 meter change in depth. The thermocline is out of contact with the surface of the lake. Temperatures may range from 80° F. at the top of the thermocline to 40° F. at the bottom of the thermocline.

The third zone is the hypolimnion which comprises the deep, cold-water region of the lake. This zone is completely sealed off from the lake surface. It is dimly lit, and in most lower elevation lakes, for example of the type found in California, hypolimnetic temperatures seldom exceed 55° F. at any time of the year.

Figure 2:
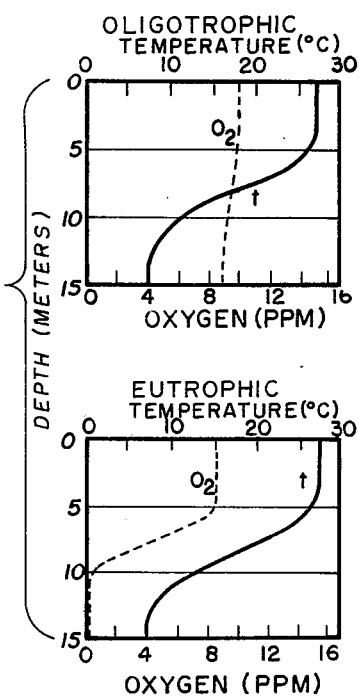
FIG. 2 comprises graphical representations comparing oligotrophic and eutrophic waters.

FIG. 2 comprises a graphic illustrative comparison between oligotrophic waters and eutrophic waters. Each graph in FIG. 2 shows changes in oxygen content and temperature as a function of depth. Oligotrophic lakes, such as Lake Tahoe, are sterile, biologically unproductive lakes and have ample oxygen at all depths. Eutrophic lakes, however, are very fertile lakes with high biological productivity and are typicaly devoid of oxygen in the lower water regions during the period of thermal stratification. Oxygen depletions may exist from within the thermocline to the bottom of the hypolimnion. This situation and its associated conditions forces the fish and certain other biota into the shallow upper zone of the lake. In many lakes the shallow depths may be too warm for coldwater species such as trout. Although oxygen concentrations are adequate, the shallow waters are too warm. Consequently, and without utilization of the present invention, only warm water species of fish will survive yearlong in eutrophic, warm water lakes.

As will be more clearly understood from the discussion and drawings below, the floating fish rearing system of the present invention is a new system whereby coldwater fish may be reared in confined areas, held at the surface, in any lake which contains an ample supply of cold water at the bottom of the lake. Even if the surface temperatures are unsuitably warm for the fish, this problem may be overcome by upwelling cold, oxygenated water from the lower region of the lake into the surface areas where the fish are confined, thus creating suitable rearing conditions for the fish.

Figure 3:
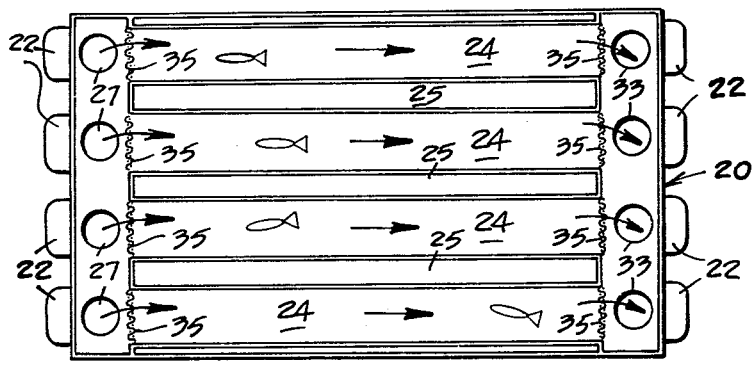
FIG. 3 is a top plan view of a preferred embodiment of the present invention.
Figure 4:
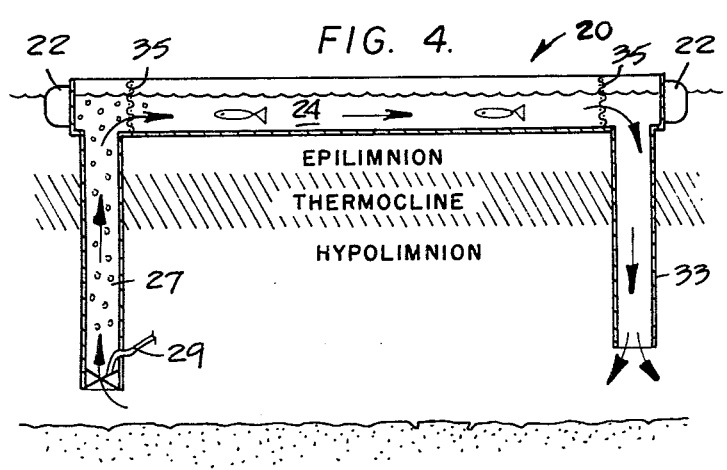
FIG. 4 is a side cross-sectional view of the FIG. 3 embodiment.
Figure 5:
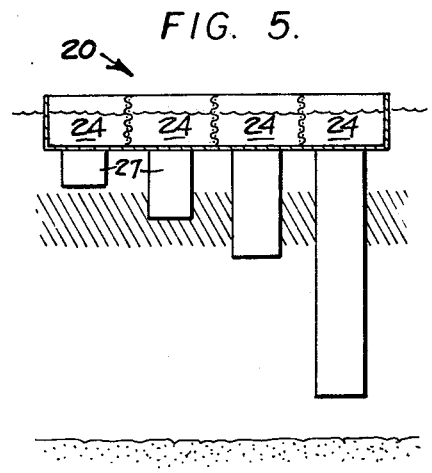
FIG. 5 is an end view of the FIG. 3 embodiment.

One preferred embodiment of the invention is shown in FIG. 3 taken in conjunction with FIGS. 4 and 5. As shown, the system includes a generally rectangular shaped floating frame structure 20. The floating frame 20 may be floatable supported upon the water surface by any well-known float means 22 spatially positioned about the perimeter of the frame. Examples of float means could be any highly buoyant material such as polyurethane foam surrounded by a suitable waterproof skin.

A plurality of longitudinal fish confining means or raceways 24 are provided within the floating frame 20. These raceways 24 are preferably of a U-shaped cross section with the tops thereof open. Raceways 24 define a relatively shallow fish confining area open to the water surface. Throughout the specification and claims the word "shallow" when applied to the fish confining area defined by the raceways means a depth not exceeding about 10-12 feet. A depth greater than this makes it difficult to monitor fish growth, feed them artificially, treat their illnesses, keep them segregated by size and harvest them at will. It should also be understood that although FIGS. 3-5 illustrate a plurality of raceways 24, obviously a single raceway or pen could be provided.

The raceways 24 may be largely constructed of low cost, flexible sheet material such as that used for pond liners. Such a material has a long life expectancy in water (e.g. 20 years) and is easily replaced if leaks develop. The liner material should be attached to a rigid, sturdy framework. In some instances, it may be necessary to insulate the raceway walls to prevent undue heat gain as hypolimnetic water circulates through the system although in most instances such insulation is not necessary. If insulation is required, it may be constructed by sandwiching a layer of asbestos sheeting between two layers of pond liner. The inner layer of pond liner should be heavy duty weight. The asbestos is then glued to this liner, and a second lightweight lines is glued over the asbestos and to the inner liner such that the asbestos is kept out of contact with the water.

As best shown in FIG. 3, a plurality of floating walkways 25 are provided longitudinally of the raceways 24. These walkways 25 allow an attendant to safely walk on the floating frame 20 and attend to the needs of the fish in the raceways 24. The floating walkways 25 might for example be of the styrofoam type such as are often found in marinas.

As shown in FIGS. 3-5, a plurality of upwelling tubes 27 are provided at one end of the floating frame 20. The purpose of the upwelling tubes is to supply water from a deeper, colder zone up to the fish confining raceways 24 near the water surface. Although in most cases only one upwelling tube 27 will be required, the embodiment shown utilizes several fixed depth upwelling tubes (see FIG. 5), each at a different depth such that an operator can draw water from a selected depth by switching to a different tube. Tubes not in use are sealed off to divert water into the raceways 24. Other embodiments of the invention (discussed later) use a single variable depth upwelling tube to serve the same function of drawing water from various selected depths. The embodiment of FIGS. 3-5 may be preferred in certain instances such, for example, as when it might be desirable to have different water temperatures in the different raceways. Such a situation could occur when the operator wishes maximum growth in one raceway (warmer water from a shallower depth), and at the same time minimum growth and food requirements in another raceway (i.e. colder water drawn from nearer the bottom of the lake). As an example, when brood fish are ripening, the water temperature must be held at 42° to 56° F. in order to assure proper egg development. These temperatures are well below those required for optimum growth. The simultaneous selection of different temperatures for different raceways gives the operator much greater flexibility and control over the production at his facilities.

As shown in FIG. 4, an air line 29 is connected to the lower end of upwelling tube 27. The air source may be a compressor (not shown) which may be located either on the floating frame 20 or the compressor may be shore based. The air line 29 may run along the bottom of the water body or may float on the water surface. If the air compressor is located on the floating frame 20, the air line 29 may be extended downwardly through the upwelling tube 27 to a position near the bottom thereof.

An air lift pump 31 is provided for injecting air into the upwelling tube 27 at the desired depth. In most cases the greatest efficiencies and benefits result from injecting the air at the deepest point in upwelling tube 27. As the air rises in the upwelling tube, it draws water into the tube from the bottom. This water mixes with the air bubbles. Oxygen diffuses into the water, and other gases such as carbon dioxide, ammonia, methane or hydrogen sulfide diffuse from the water into the air bubbles. Upon reaching the top of upwelling tube 27, or the raceways 24, the gas bubbles separate from the water before the water flows through the raceways 24 and is discharged through downwelling tubes 33. Hence, air injection serves several functions: it oxygenates the water, it removes undesirable gases, and it pumps water through the system. Of course, an impeller can also be used for upwelling water within tube 27.

As also shown in FIG. 5, some form of suitable screen means 35 are provided for confining the fish in the raceways 24 and for controlling the size of particles, etc., allowed from the upwelling tubes 27 into the raceways 24.

FIGS. 6-8 ae schematic representations illustrating a modified embodiment of the invention. In FIGS. 6-8 a floating frame 40, similar in construction to previously discussed floating frame 20, is provided with a single variable depth upwelling structure shown generally at 42. The upwelling structure 42 comprises a pair of telescoping tubular members 44 and 46 with prime move means, such as winch 48 and connecting member 49 attached to tube 46, for moving tube 46 relative to tube 44. A flexible air injection hose 50 is connected to diffusor 51 which is attached to the lower end of tube 44 so that air under pressure from a suitable source 52 may be injected into the upwelling structure 42.

In operation in FIGS. 6 and 7, the tube 46 is lowered to a suitable cold water depth and water flows in at the upper portion of tube 46 and down the space 54 between tube 46 and tube 44 and then up through tube 44 to one or more raceways (not shown).

Prime numerals in FIG. 8 illustrate components identical with those described in FIGS. 6 and 7. The tubes 44' and 46' are slidably sealed as by means of O-ring seals 56 or the like and the water enters through the bottom of tube 46' which is provided with a movable closure element or trap door 58 as shown.

In FIGS. 6-8 a single upwelling structure is provided with means for upwelling water from various water depths. The advantages of variable depth selection are that the operator can select the depth which has optimum temperature, oxygen, food and other conditions or the fish.

FIG. 9 shows yet another embodiment of the invention. In FIG. 9 a floating frame 60 is provided with a movable upwelling tube 62 which is rotatably connected at 64 to a lower portion of the frame. One or more fixed upwelling tubes 66 are in fluid communication with movable upwelling tube 62 by means of hollow tube 68 at the base of the frame 60. A floating miniframe 70 has a winch 74 and cable means 75 extending from the winch to the outer end of movable upwelling tube 62. A flexible air injection hose 76 is connected to diffusors 78 within tubes 66 so that air under pressure from a suitable source may be injected into the tubes 66. A light trap 79 may be attached to the outer end of upwelling tube 62 to attract zooplankton, the latter of which animals may contribute some or all of the food requirements for the fish. The light trap 79 may be of any type known in the art and could, of course, be used in conjunction with other embodiments of the invention herein described.

FIG. 10 shows another modification of the invention. In FIG. 10 the floating frame 80 is provided with parallel raceways 82 and walkways 84. Screens are provided as shown at 83. Water enters the raceways 82 from a single upwelling outlet 85 and flows through the raceways by reversing flow direction and leaves through the downwelling outlet 84. This configuration allows for a longer length of connected raceway. By locating the upwelling outlet at one end and the downwelling outlet at the other, this type of configuration could be modified so as to provide one continuous raceway.

Figure 11:
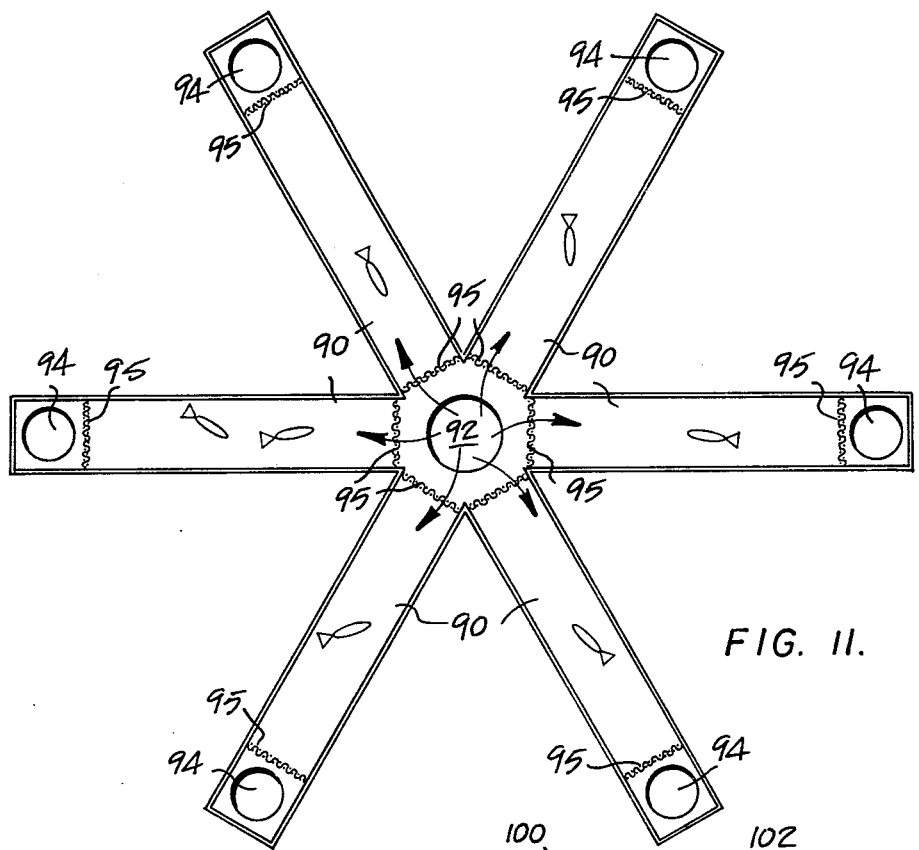

FIG. 11 shows another modification of the invention. In this modification a plurality of radial raceways 90 are provided. A central opening 92 is provided and openings 94 are provided at the radially outer ends of the raceways. Screens are provided as shown at 95. This configuration may be used by providing a vertically adjustable upwelling tube in association with central opening 92 in which case water flows radially outwardly through the raceways and is downwelled through openings 94. On the other hand, if it is desired to have different water temperatures in each raceway 90, the openings 94 may be connected to fixed or variable length upwelling tubes in which case water flows radially inwardly through the raceways and is downwelled through opening 92.

Figure 12:
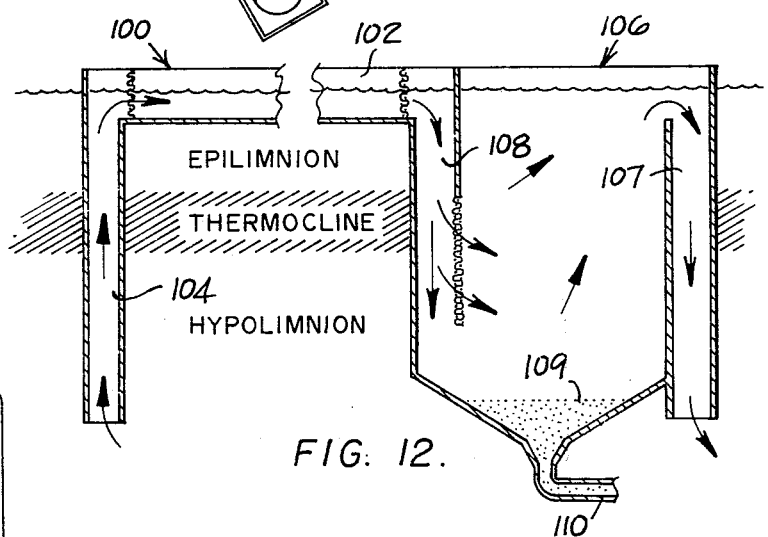
FIG. 12 is a schematic cross-sectional view of a modified form of the invention having a waste settling tank.

FIG. 12 illustrates another modification of the invention utilizing a waste settling tank. In FIG. 12 a floating frame 100 is provided with one or more raceways and an upwelling tube 104. A waste settling tank shown or more raceways and an upwelling tube 104. A waste settling tank shown generally at 106 is provided on the floating frame 100 and is in fluid communication with the water flow emitted from the raceways 102 by means of the downwelling passageway 108. Baffles or screens, etc., may be utilized in the waste settlement tank so that the water will have a slower flow and a relatively long residence time in the tank 106, thus allowing waste materials to settle out while the cleansed water flows out passageway 107. The wastes 109 will then collect in the bottom of tank 106 where they can be withdrawn through pipe 110 and pumped in concentrated form to the shore or some other suitable disposable location. The tank 106 may be constructed of plastic pond liner materials similar to those previously discussed with respect to construction of the raceways. The settling process may also be aided through the use of alum, lime or some other floculating material. Much of the solid waste and some of the nitrogen and phosphorous can be removed by this system.

Figure 13:
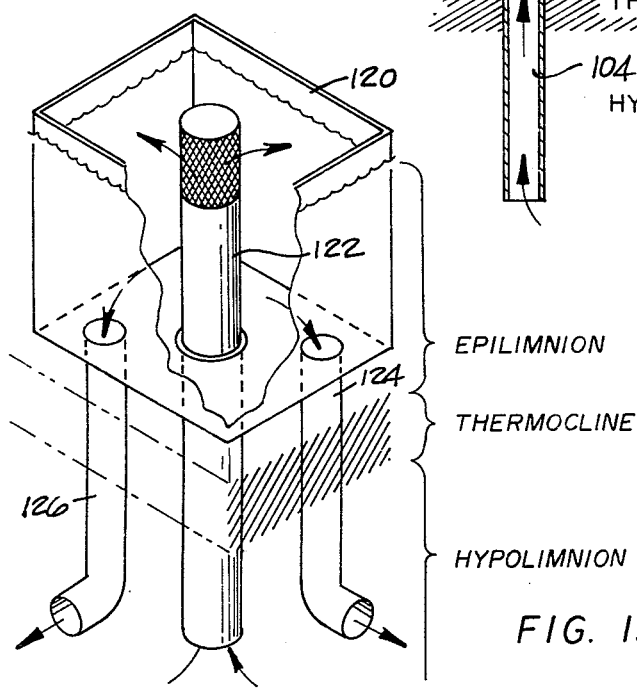
FIG. 13 shows a floating pen without raceways.

FIG. 13 illustrates a large floating pen configuration. Floating pen 120 is provided with a central upwelling tube 122 and a plurality of down-welling passageways 124 and 126. As in the other modifications of the invention, an air lift pump or some mechanical means such as an impeller may be used to upwell water into the pen 120. This pen can have a very deep interior.

While I have illustrated and described preferred embodiments of my inventional, it is to be understood that these are capable of variation and modification, and I therefore do not wish to be limited to the precise details set forth, but desire to avail myself of such changes and alterations as fall within the purview of the following claims.

I claim:
1. A floating fish rearing system comprising:
   a. a floating frame structure having float means for maintaining said frame structure in a stable position on the surface of a water body;
   fish confining raceway means within said floating frame for defining at least one area of shallow depth near the water surface;
   c. upwelling means associated with said floating frame for supplying water from a deeper cold water zone within the water body up to the area defined by the fish confining means;
   d. means associated with the upwelling means for pumping water upwardly through the upwelling means; and
   e. discharge means associated with said floating frame and operatively connected to said fish confining means at a position which is downstream of said upwelling means whereby water flows from the upwelling means through the fish confining means and out the discharge means.

2. A floating fish rearing system as set forth in claim 1 wherein a light trap means is operatively associated with the lower end of said upwelling means.

3. A floating fish rearing system as set forth in claim 1 wherein a waste settling tank is provided downstream of said downwelling means.

4. A floating fish rearing system as set forth in claim 1 wherein said upwelling means comprises variable depth means for extending to different water depths.

5. A floating fish rearing system as set forth in claim 4 wherein a plurality of raceways are provided on the frame.

6. A floating fish rearing system as set forth in claim 4 wherein a waste settling tank is provided downstream of said downwelling means.

7. A floating fish rearing system as set forth in claim 4 wherein said variable depth means comprises a plurality of fixed length tubular members each of which extends to a different water depth.

8. A floating fish rearing system as set forth in claim 4 wherein said variable depth means comprises vertical movable means for extending to various water depths.

9. A floating fish rearing system as set forth in claim 8 wherein said vertical movable means comprises a telescoping tube assembly.

10. A floating fish rearing system as set forth in claim 8 wherein said vertical movable means comprises a tube horizontally pivoted to the floating frame for movement to various water depths.

11. A floating fish rearing system as set forth in claim 1 wherein a plurality of raceways are provided on the frame.

12. A floating fish rearing system as set forth in claim 11 wherein said raceways are interconnected so that water flow through the raceways follows a generally S shaped pattern.

13. A floating fish rearing system as set forth in claim 11 wherein a plurality of walkways are provided on the frame.

14. A floating fish rearing system as set forth in claim 11 wherein said raceways are in the form of integral radially extending arms, each arm having an opening at its outer end and each arm in communication with a central opening where the arms are centrally joined to each other.

15. A floating fish rearing system comprising:
   a. a floating frame structure having float means for maintaining said frame structure in a stable position on the surface of a water body;
   upwelling means associated with said floating frame for supplying water from a deeper water zone within the water body up to the area defined by the fish confining means;
   c. means associated with the upwelling means for pumping water upwardly through the upwelling means; and
   d. discharge means associated with said floating frame and operatively connected to said fish confining means at a position which is downstream of said upwelling means whereby water flows from the upwelling means through the fish confining means and out the discharge means.

* * * * *